United States Patent

[11] 3,619,060

[72] Inventor Joseph E. Johnson
Physics Department, University of S.C., Columbia, S.C. 29208

[21] Appl. No. 777,117
[22] Filed Nov. 19, 1968
[45] Patented Nov. 9, 1971

[54] IDENTIFICATION DEVICE
22 Claims, 9 Drawing Figs.

[52] U.S. Cl. .......... 356/71, 70/277, 250/219 DQ, 356/168
[51] Int. Cl. .......... G01b 9/08
[50] Field of Search .......... 250/219; 340/149; 356/71, 168, 167, 165, 166; 283/7; 70/277

[56] References Cited

UNITED STATES PATENTS

| | | | |
|---|---|---|---|
| 1,775,794 | 9/1930 | White | 356/71 X |
| 2,423,370 | 7/1947 | Butscher | 356/168 |
| 3,200,701 | 8/1965 | White | 356/71 X |
| 3,201,961 | 8/1965 | Williams et al. | 356/71 X |
| 3,292,149 | 12/1966 | Bourne | 340/146.3 |
| 3,231,861 | 1/1966 | French | 340/149 |
| 3,383,657 | 5/1968 | Claassen et al. | 340/149 |
| 3,398,558 | 8/1968 | Benenati | 250/219 X |

FOREIGN PATENTS

| | | | |
|---|---|---|---|
| 473,804 | 3/1929 | Germany | 88/14 |
| 998,272 | 1/1952 | France | 356/71 |

*Primary Examiner*—Ronald L. Wibert
*Assistant Examiner*—J. Rothenberg
*Attorney*—Ward, McElhannon, Brooks & Fitzpatrick

ABSTRACT: An identification device which includes a source of parallel light beams, a prism having a face for receiving the light beams and having another face for receiving an object to be identified, apparatus for receiving an image of the object and additional apparatus for comparing the image of the object with a known image.

INVENTOR.
JOSEPH E. JOHNSON
BY
Ward, McElhannon, Brooks & Fitzpatrick
ATTORNEYS

INVENTOR.
JOSEPH E. JOHNSON

BY

Ward, McElhannon, Brooks & Fitzpatrick
ATTORNEYS

INVENTOR.
JOSEPH E. JOHNSON

BY

Ward, McElhannon, Brooks & Fitzpatrick
ATTORNEYS

IDENTIFICATION DEVICE

This invention relates to identification devices and more particularly to a device which employs optical apparatus for comparing an object to be identified with a preselected image. The device is particularly adapted, among other possible applications, for use by a person having to identify himself for cashing a check, obtaining credit, charging with a credit card, and negotiating various business transactions. The inconvenience of trying to identify oneself is a daily problem. The prior art practice of signature and photograph comparison along with a physical description are obviously inadequate. Signature comparison required judgment and physical appearances change rapidly. As society approaches a state of noncash transactions, the problems become acute. An example of one problem encountered with the prior art practice is the stolen credit card racket. One accepted method of positive identification is fingerprint comparison. However, the prior art approach was totally impractical because print comparison required considerable time and a trained examiner.

It is an object of the present invention to overcome the deficiencies of the prior art and to provide a new and improved identification device, as will become apparent as the description proceeds.

Additionally, apparatus constructed in accordance with the concept of my invention is particularly useful in the construction of locking devices and still further for various industrial applications where it is desirable to compare, visually or automatically, raised sections of a surface to a predetermined image.

Briefly, my invention contemplates the provision of an identification device embodying a source of parallel light beams, prism means having a face perpendicularly disposed with respect to the light beams and having a second face angularly disposed with respect to said first face at an angle of at least about 42° with respect to said first face for reflecting said light beams. The second face is arranged for receiving an object to be identified, such as a human finger on the hand of a person to be identified, for example. Lens means are employed which are constructed and arranged to receive light scattered by the points of contact of said object on the second face or by light reflected between the points of contact, thereby to form an image on a focal plane. In addition, according to my concept, means are furnished for comparing the image of said object with a known image.

In one form of this invention, the means for providing light beams includes a light source and a lens mounted for deflecting the light beams from the light source into parallel relationship one with respect to the others. A prism is provided with a first face disposed substantially perpendicular to the light beams, a second elongated face disposed at an angle of at least about 42° with respect to the first face for internally reflecting the light beams, third elongated face disposed in parallel relationship with respect to the second face for internally reflecting the light beams, and a fourth reflectively coated face which is disposed at an angle substantially equal to the angle between the first and second faces for reflecting the light beams back on their original courses. When an object to be identified is placed on the second face, the internal reflection is broken at the points of contact and the incident light at these points is scattered. A second lens is arranged to receive some of the scattered light and to focus it into a beam splitter, and in conjunction therewith means are included for comparing the image of the object to be identified with a preselected known image. It will be appreciated that this method of obtaining optical images is an improvement over the prior art by reason of the fact that distortion and focus problems are completely eliminated while contrast is kept very high.

According to a form of my invention, the means for comparing the image of the object to be identified and the known object includes a beam splitter for directing light beams received from the second lens to each of two focal planes. A first photocell and a second photocell for purposes of electrically comparing the two images may be placed next to the focal planes. A known transparency image is interposed in the focal plane between the beam splitter and the second photocell. A source of power supply is connected to each of the photocells. A first variable resistor has one terminal connected to the power supply and a second terminal connected to the first photocell. A second variable resistor has one terminal connected to the power supply and a second terminal connected to the second photocell. Indicator means are employed which have one terminal connected to the first variable resistor and its second terminal connected to the second variable resistor. The indicator means may be in the form of a voltmeter or it may be in the form of a relay operated upon a predetermined differential voltage between the first variable resistor and the second variable resistor. Still further, in accordance with one aspect of my concept means are employed for determining whether or not excessive or inadequate pressure is being applied by the object against the second face of the prism.

According to another aspect of my invention means are provided for carefully positioning the object to be identified such as a finger on the second face of the prism. In still another form of my invention means are provided for viewing the superimposed images on a screen utilizing two different colored lights for distinguishing the image of the object being identified with the known image.

In some cases a person's finger may have sustained some injury or swelling which causes the finger pattern to be slightly misplaced on the prism. Rather than having the person reapply his finger to the prism, it is more convenient to move the transparency through a search pattern over a small area. This is done by mounting the transparency in a frame which can be moved horizontally and vertically in a search pattern until the transparency is positioned in its correct position for the photocell to recognize the affirmative comparison.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings forming a part of the specification, wherein.

Figures 1, 2, 3:
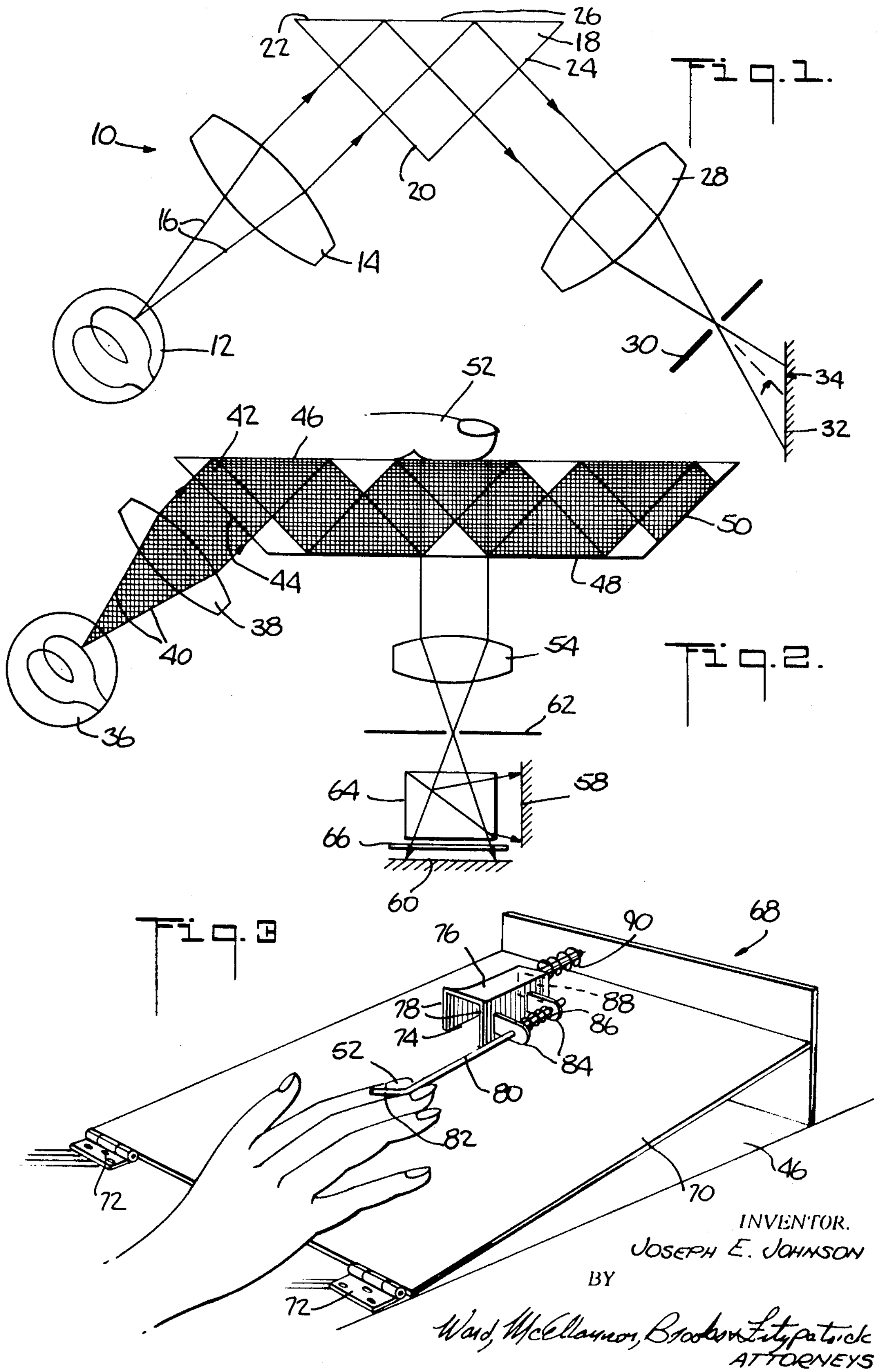
FIG. 1 is an elevational view showing the optic portion of the apparatus of my invention.
FIG. 2 is an elevational view of another form of optic portion of the apparatus.
FIG. 3 is an enlarged perspective view of the finger-locating apparatus according to the concept of my invention.

Referring to the drawings in further detail, as shown in FIG. 1, a portion of an identification device, indicated generally at 10, embodies a light source 12, and a lens 14 for deflecting the light beams 16 into parallel relationship one with respect to another. A prism 18 is provided with a first face 20 which is disposed in perpendicular relationship with respect to the light beam 16 passing therethrough. The prism has a second face 22 which is disposed at an angle of at least about 42° with respect to the first face 20 and preferably at an angle of about 45° with respect thereto. Also, prism 18 has a third face 24 which is disposed at an angle with respect to the second face 22 which is substantially equal to the angle between the first face 20 and the second face 22, and preferably at an angle of about 45°. It will be appreciated that the phenomenon of total internal reflection of light occurs when the angle of incidence, relative to the normal, with respect to an interface between substances with indices of refraction $n_1$ and $n_2$ is greater than or equal to the critical angle $\Phi = \arcsin n_1/n_2$. A glass-air interface gives a critical angle of about 42°. Thus, a 45°–90°–45° prism may be used as a mirror, because 45° is greater than 42° when the light enters perpendicular to one interface. However, the light will not be reflected at the interface at those points where something touches the interface and thus destroys the index of refraction ratio of the glass and the air. For example, by looking into a prism perpendicular to the surface and touching the reflective interface with one's finger one sees a perfect image of the fingerprint. This is because the ridges of the print touch the interface and thereby destroy the reflective condition at those points. No matter how close something is to the prism interface, as long as it does not touch the interface it does not destroy the total internal reflection of light in the prism, and thus is not visible to the eye.

The object to be identified, which may be a human finger on the hand of a person to be identified, is positioned on the second face 22, as at 26. The light beams 16 pass into the prism 18 perpendicularly to the face 20, and an image is formed of the fingerprint because the light is reflected between points of contact between the finger and the second face. The reflected light comes out through face 24 of the prism and is focused with an achromatic lens 28 through a diaphragm 30 onto an inclined focal plane 32. The focal plane is inclined at an angle indicated at 34 which is equal to the angle between the first and second faces 20 and 22, respectively, which angle is also equal to the angle between the second and third faces 22 and 24, respectively. This is because the image on the prism is inclined. The inclination of the focal plane serves to greatly reduce the problem of distortion and simultaneously reduces the problem of focus. In addition, the focus is further improved if the focal length of the lenses is appreciably greater than the depth of field (finger width). However, I have found that a short focal length gives overall satisfactory operation and serves to compact the device.

Referring next to FIG. 2, another means is illustrated for obtaining an optical image of an object being identified such as a fingerprint, for example. This device comprises a light source 36 and a lens 38 for deflecting the light beams 40 into parallel relationship one with respect to the others. A prism 42 is employed having a first face 44 which is perpendicularly disposed with respect to the light beams 40, a second elongated face 46 being disposed at an angle of greater than about 42° with respect to the first face 44, and preferably about 45° with respect thereto for internally reflecting the light beams, a third elongated face 48 being disposed in spaced, parallel relationship with respect to the second face for internally reflecting the light beams, and a fourth reflectively coated face 50, which is disposed at an angle substantially equal to the angle between the first face 44 and the second face 46, for reflecting the light beams back on their original courses. Preferably the fourth face 50 is silver coated. In operation, the parallel light enters through face 44 and is reflected back and forth between faces 46 and 48 at which internal and complete reflection occurs until the light gets to face 50 where it is reflected back along its original course, thereby doubling the light incident upon face 46. When a finger 52 is placed on a medial portion of face 46, the internal reflection is broken at the points of contact and the incident light at these points is partially absorbed and partially reflected, i.e. scattered. Some of the scattered light will pass straight down through face 48 where it passes through without dispersion or distortion to a lens 54 which focuses the image into a beam splitter, indicated at 64, with resulting focal planes 58 and 60. Photocells may be placed just beyond these focal planes, as will be pointed out more fully hereinafter. It should be appreciated that none of the light incident on the points of face 46 which are not in contact with a ridge of the finger can be reflected in a downward direction to be absorbed by the lens. Hence, the area in between the ridges appears in the image to be perfectly black. In this manner high contrast is obtained. As best seen in FIG. 2, a shutter or diaphragm 62 is interposed between the lens 54 and the beam splitter 64. The beam splitter 64 serves to direct the image to the focal planes 58 and 60. A known transparency image 66 may be placed at the focal plane 60 for comparative purposes.

When the device is in the form of personal identification means employing fingerprint comparison, the bearer carries an identification card with whatever information one chooses being inscribed thereon together with a photographic fingerprint image transparency which may be of microfilm size, if desired. The card is inserted into the device and by placing one's finger on the device, the device determines whether or not the fingerprint matches that on the card, and hence whether or not the card refers to the bearer.

The image transparency 66, FIG. 2, may be prepared by using the same apparatus as described above, but employing a shutter, as at 62 and a piece of photographic film instead of the image transparency 66. If substantially identical devices are employed for preparing the image transparency as are employed for comparing the images, then both images are substantially identical.

Figure 4:
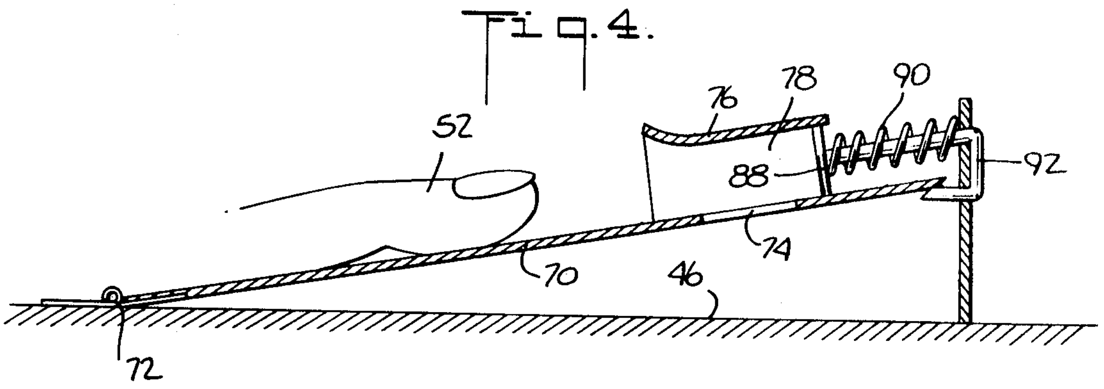
FIG. 4 is a medial longitudinal sectional view of the finger-positioning means of FIG. 3.

As best seen in FIGS. 3 and 4, apparatus, indicated generally at 68, is provided for positioning the finger repeatedly in the same position. This apparatus comprises a thin plate 70 pivotally mounted adjacent the second face 46 of the prism, as at 72. The second face could also be face 22, FIG. 1. The plate 70 has an opening 74 for the finger 52 to physically engage the second face 46 when the finger is in position. A top guide 76 and a pair of side guides 78 are disposed adjacent the opening 74 to position the finger on said plate. A rod 80 having an angle piece 82 is mounted, as by means of brackets 84, to fit snugly between two fingers on the hand of a person to be identified. As the hand is pushed forward, the hand guide rod slightly resists the motion by reason of a small spring 86, but allows the hand to follow a straight course. The finger continues forward between the guides 76 and 78, and then encounters a small stop 88 which presents itself at the end of the finger. Thence, the stop moves forward against the resistance of a spring 90 until at a predetermined position, with the finger over the hole 74, the stop releases a trigger 92 allowing the plate 70 to move vertically downwardly to apply the finger 52 to the base 46 of the prism. Accordingly, the finger is repeatedly positionable on the prism.

Figures 5, 6:
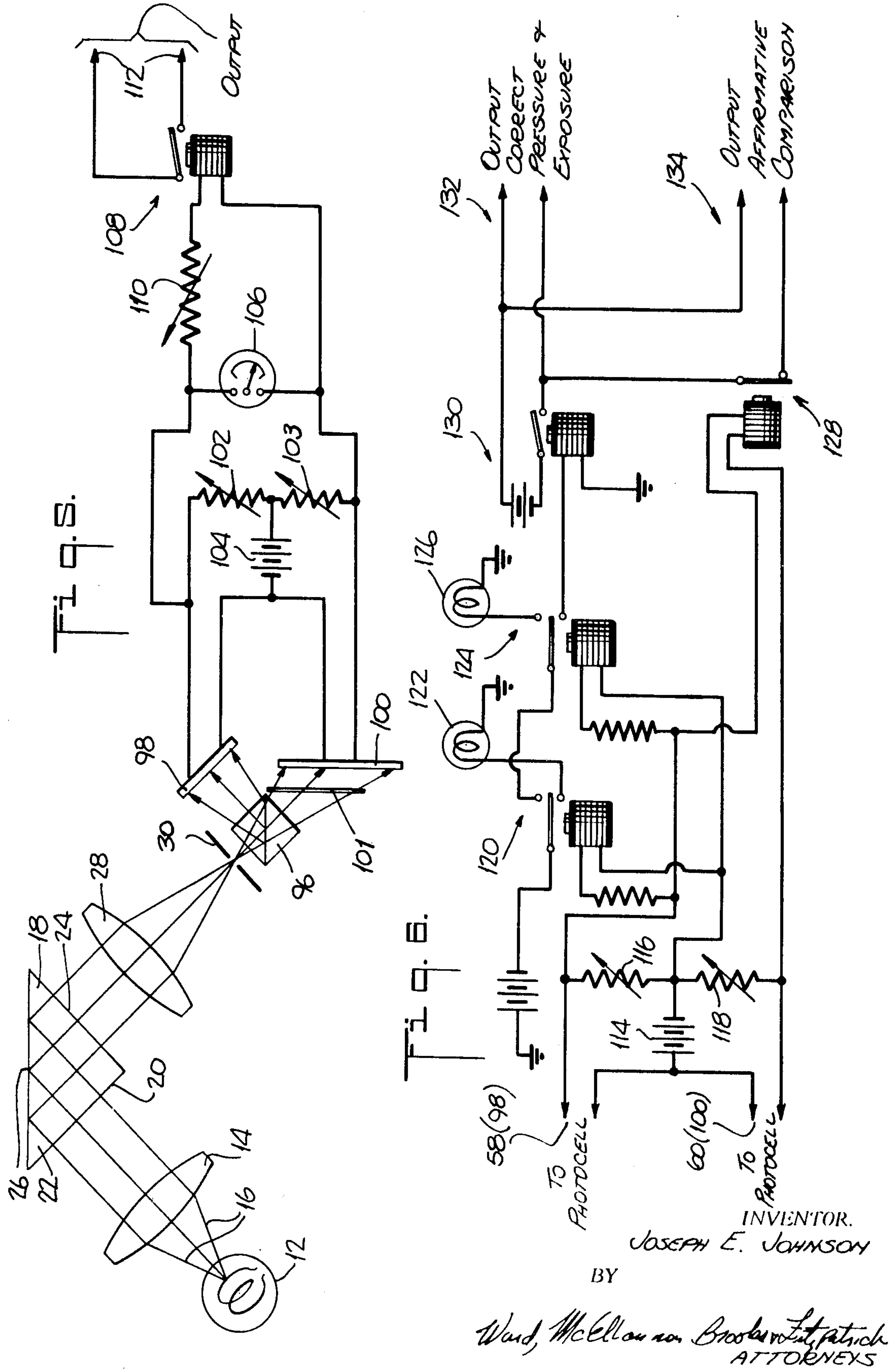
FIG. 5 is an electrical circuit diagram showing means for comparing the image of the object being identified with a known object.
FIG. 6 is an electrical circuit diagram showing another embodiment for comparing the image of the object being identified with a known object.

Referring next to FIG. 5, means are shown for comparing an image of an object to be identified, such as was described in connection with FIG. 1 and in connection with FIG. 2, and a transparency of a known image. A beam splitter 96 receives the image from lens 28, and splits the image into photocell 98 and photocell 100. A known image transparency 101 is interposed at the focal plane between the beam splitter 96 and the photocell 100. When the object being identified corresponds to the known image transparency, the print image or the image to be compared, which is immediately formed, falls line for line onto the transparency. As the light lines in the print image fall on the clear lines in the transparency and the dark lines of the print image fall on the black lines in the transparency, then if the patterns match exactly, the total intensity of the light in the photocell 100 is not diminished by its passing through the transparency. When the match is not perfect, then the percentage of light admitted through the transparency and onto the photocell 100, as compared to the light on the photocell 98, will give a measure of the agreement. The photocells 98 and 100 may be cadmium sulfide resistance photocells with variable resistance, if desired. The comparative apparatus comprises power supply means 104 having one terminal connected to one terminal of photocell 98, and to one terminal of the photocell 100. A variable resistor 102 is provided having one terminal connected to the second terminal of the power cell 104 and having its second terminal connected to the second terminal of the photocell 98. A second variable resistor 103 is also used having one terminal connected to the second terminal of the power source 104 and having its second terminal connected to the second terminal of the photocell 100. Indicator means, such as voltmeter 106, for example, is connected between the second terminal of the resistor 102 and the second terminal of the resistor 103. This gives a visual measurement of the agreement on the meter. In addition, a relay, indicated generally at 108, may be connected in series with a variable resistor 110 across the lines, as shown, so that by adjustment of the variable resistors one can select a particular degree of required agreement between the image of the object to be identified and the preselected transparency image. The relay is provided with output means 112 so that an excessive variation differential will trigger the relay 108 and activate the output means to operate any system desired.

Referring next to FIG. 6, another form of image comparing means is shown. Photocells, such as 58, 60 (FIG. 2) or 98, 100 (FIG. 5) each have one terminal connected to one terminal of power supply means 114. A variable resistor 116 is used having one terminal connected to the second terminal of the power supply means 114 and having its second terminal connected to the second terminal of the photocell 58 (98). A second variable resistor 118 is used having one terminal connected to the second terminal of the power supply means 114 and having its second terminal connected to the second terminal of the photocell 60 (100). A first relay means, indicated generally at 120, is connected between the second terminal of the photocell 58 (98) and the second terminal of the power supply means 114. This relay is operable and activates a signal, such as a light 122, when excess pressure is applied to the second face 46 (26) of the prism 42 (18) by the object being identified. The activation of the relay occurs by virtue of excess pressure resulting in a dark pattern and hence less light to photocell 58 (98) and consequently an increased voltage drop across resistor 116. A second relay means, indicated generally at 124, is connected between the second terminal of the photocell 58 (98) and the second terminal of the power supply means 114. This relay is operable when adequate pressure is applied to the second face 46 (26) by the object being identified, and when operated deactivates light 126. A third relay means, indicated generally at 128, is connected between the second terminal of the photocell 58 (98) and the second terminal of the photocell 60 (100). This relay means is operable when the comparison between the two photocells is not affirmative. That is, this relay operates when the light received by the two photocells is substantially different. A fourth relay means, indicated generally at 130, is connected to the second relay, and is operable when the second relay 124 is actuated, and the first relay 120 is not activated. If correct pressure is applied by the object to be identified and if there is an affirmative comparison, then the output means indicated generally at 132, and the output means indicated generally at 134, are both activated. Output means 132 could be used to activate a shutter, such as shutter 62, FIG. 2, or shutter 30, FIG. 1, in making the known image transparency photograph, for example. Any suitable system may be connected to output means 134 such as an indicator, for example. Also, output means 134 may be used to actuate a locking mechanism, if desired.

Figure 7:
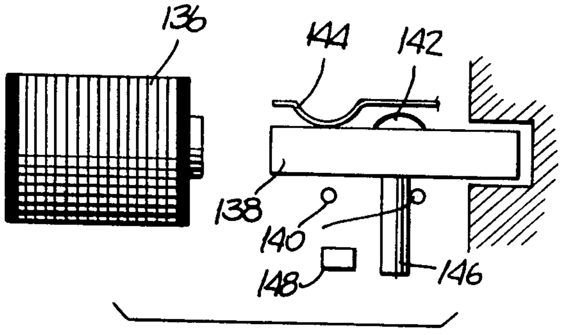
FIG. 7 is a side elevation showing apparatus for operating a locking device.

When the identification device of my invention is constructed to function as a lock device, the transparency is stored inaccessibly within the device. When it is desired to have several people open the lock, their respective transparencies are mounted on a clip or reel which presents the desired transparency when a dial (not shown) on the exterior of the lock is turned. Accordingly, in order to open the lock, the person dials the number on the dial corresponding to his transparency, presents his finger for comparison, and upon receiving affirmative comparison results the output means, 134 (FIG. 6), is activated and a lock is opened or a door is operated. Referring to FIG. 7, electromagnetic means 136 is activated by output means 132, for example. An iron bar 138 is mounted for movement responsive to the electromagnet 136 between a first position and a second position, and stop means 140 serves to limit the travel of the bar in its respective positions. The bar is provided with a raised area 142 which is engageable with a spring strip 144, and the bar is also provided with a projecting arm 146 which is engageable with lock pin means 148 so that the lock is movable to locked position by moving the pin means 148 to the right, thereby moving the bar 138 to the right, as viewed in FIG. 7. When the electromagnet 136 is activated, the bar 138 is moved to the left as viewed in FIG. 7, thereby moving the lock pin means 148 to the left into its lock-released position.

Figure 8:
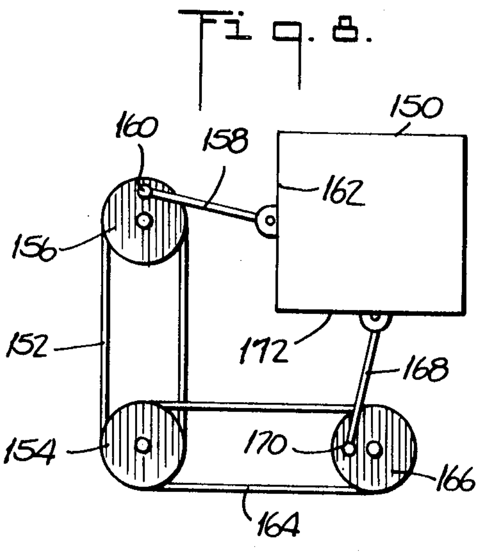
FIG. 8 is an enlarged plan view of apparatus for positioning the transparency.

In some cases, the finger pattern may be slightly misplaced on the prism for any number of reasons, such as when a person's finger has sustained some injury, for example. It may be more convenient to move the transparency through a search pattern over a small area instead of requiring the person to reapply his finger to the prism. Apparatus for positioning a transparency with respect to the second photocell, such as photocell 60 or 100 includes a frame 150, FIG. 8, in which the known image transparency is mounted. An endless belt 152 serves to connect the motor means 154 with a first wheel 156 to which a rod 158 is eccentrically connected, as at 160, the other end of rod 158 being connected to one edge 162 of the frame 150. Another endless belt 164 serves to connect motor means 154 with a second wheel 166 to which rod 168 is eccentrically connected, as at 170, the other end of rod 168 being connected to another edge 172 of frame 150. A search pattern is achieved by operating motor means 154, and then as the transparency is passed through the correct position, the photocell would indicate an affirmative comparison, provided that the search pattern is not executed too rapidly relative to the photocell response time.

Figure 9:
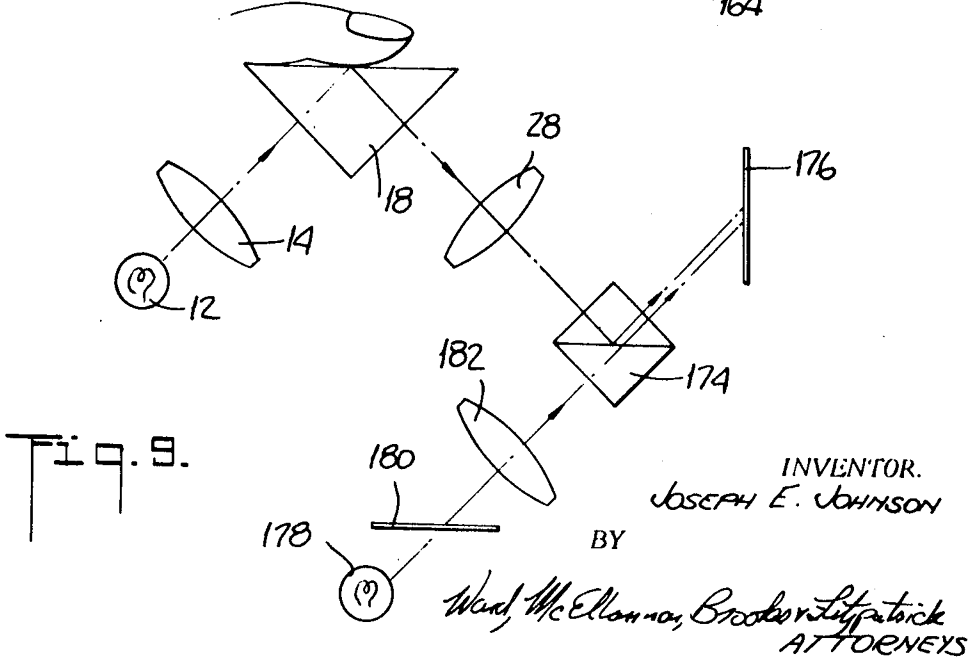
FIG. 9 is an elevational view of another form of identification device constructed in accordance with my concept.

With reference to FIG. 9, there is shown a means for viewing superimposed images on a screen, the two images being distinguished one from the other by using a different colored light source for each image. An image of the object to be identified is received by beam splitter 174 from lens 28 in a manner, as described hereinbefore in connection with the embodiment of FIG. 1, and then is reflected by beam splitter 174 onto an inclined screen 176. A second light source 178, of a different color with respect to the light source 12, is used to direct a beam of light through an image transparency 180 to a lens 182 which directs the image through beam splitter 174 and onto screen 176. The two images are compared on the screen 176 by reason of the two different colored light sources employed.

It will thus be seen that the present invention does indeed provide an improved identification device which is superior in simplicity, economy and efficiency as compared to prior art such devices. In addition, operation of the present device requires no experience or ability. No preparation of the finger is needed except that it be reasonably free from foreign material and there is no inconvenience such as the use of inks or powders to the person being identified. The entire process of comparison is instantaneous and the size of the device is very small.

Although certain particular embodiments of the invention are herein disclosed for purposes of explanation, various modifications thereof, after study of this specification, will be apparent to those skilled in the art to which this invention pertains, and references should accordingly be had to the appended claims in determining the scope of the invention.

What is claimed and desired to be secured by Letters Patent is:

1. An identification device comprising means for providing light beams in parallel relationship one with respect to another, a prism having a first face disposed substantially perpendicular to said light beams, a second face disposed at an angle greater than about 42° with respect to said first face for internally reflecting said light beams, a third face angularly disposed with respect to said second face, said second face being arranged for receiving an object to be identified in direct physical contact therewith, and means for comparing the image formed by the light reflected between the points of contact of said object to be identified with a known image, said object to be identified is a human finger on a hand of a person to be identified, and further comprising means for positioning said finger on said second face including a plate pivotally mounted adjacent said second face, an opening in said plate for said finger to physically engage said second face when said finger is in position, a top guide and a pair of side guides disposed adjacent said opening to position said finger on said plate, rod means mounted and constructed to fit snugly between two fingers on said hand, said rod being resiliently mounted, resiliently mounted stop means engageable with the end of said finger, trigger means for retaining said plate at an angle with respect to said second face, said stop means being constructed to release said trigger when said finger is in its position, thereby bringing said finger into direct physical engagement with the second face.

2. An identification device comprising means for providing light beams in parallel relationship one with respect to another, a prism having a first face disposed substantially perpendicular to said light beams, a second face disposed at an angle greater than about 42° with respect to said first face for internally reflecting said light beams, a third face angularly disposed with respect to said second face, said second face being arranged for receiving an object to be identified in direct physical contact therewith, and means for comparing the image formed by the light reflected between the points of contact of said object to be identified with a known image, said means for comparing images comprising a beam splitter, a lens means constructed and mounted to receive a light reflected at locations on said second face where said object to be identified does not contact said second face and to project the reflected light through said beam splitter, diaphragm means interposed between said lens means and said beam splitter, a first photocell and a second photocell, said beam splitter being arranged to direct light beams received from said lens to each of said photocells, a known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said first photocell, a second variable resistor having one terminal connected to the second terminal of said power supply means and having its second terminal connected to the second terminal of said second photocell, first relay means connected between the second terminal of said first photocell and the second terminal of said power supply, said first relay means being operable when excess pressure is applied to said second face by the object being identified, second relay means connected between the second terminal of said first photocell and the second terminal of said power supply means, said second relay means being operably actuated when adequate pressure is applied to said second face by the object being identified, third relay means connected between the second terminal of said first photocell and the second terminal of said second photocell, said third relay means being operable when the comparison is not affirmative, fourth relay means connected to said second relay means, said fourth relay means being operable when said second relay means is actuated and said first and third relay means are not activated, and output means connected to said fourth relay means.

3. An identification device comprising means for providing light beams in parallel relationship one with respect to another, a prism having a first face disposed substantially perpendicular to said light beams, a second face disposed at an angle greater than about 42° with respect to said first face for internally reflecting said light beams, a third face angularly disposed with respect to said second face, said second face being arranged for receiving an object to be identified in direct physical contact therewith, and means for comparing the image formed by the light reflected between the points of contact of said object to be identified with a known image, said means for comparing images comprising a beam splitter, lens means constructed and mounted to receive the light reflected at locations on said second face where said object to be identified positioned on said second face does not contact said second face and to project the reflected light through said beam splitter, diaphragm means interposed between said lens means and said beam splitter, a first photocell and a second photocell, said beam splitter being arranged to direct light beams received from said lens to each of said photocells, a known image transparency interposed between said beam splitter and said second photocell, power supply means, one terminal of said power supply means being connected to one terminal of said first photocell and said one terminal of said power supply means being connected to one terminal of said second photocell, power a first variable resistor having one terminal connected to the second terminal of said power supply means and having its second terminal connected to the second terminal of said first photocell, a second variable resistor having one terminal connected to the first terminal of said power supply means and having a second terminal connected to a second terminal of said second photocell, 42°-means having one terminal connected to the second terminal of said first variable resistance and its second terminal connected to the second terminal of said second variable resistance.

4. An identification device according to claim 3 wherein said indicator means comprises a voltmeter.

5. An indicator device according to claim 3 wherein said indicator means comprises a relay operable upon a predetermined differential voltage between the second terminal of said first variable resistance and the second terminal of the second variable resistance.

6. An identification device comprising means for providing light beams in parallel relationship one with respect to another, a prism having a first face disposed substantially perpendicular to said light beams, a second face disposed at an angle greater than about 42° with respect to said first face for internally reflecting said light beams, a third face angularly disposed with respect to said second face, said second face being arranged for receiving an object to be identified in direct physical contact therewith, and means for comparing the image formed by the light reflected between the points of contact of said object to be identified with a known image, said means for comparing images comprising a beam splitter, a lens constructed and mounted to receive the light reflected at locations on said second face where said object to be identified positioned on said second face does not contact said second face and to project the reflected light through said beam splitter, diaphragm means interposed between said lens means and said beam splitter, a first photocell and a second photocell, said beam splitter being arranged to direct light beams received from said lens to each of said photocells, a known image transparency interposed between said beam splitter and said second photocell, and means for comparing the amount of light reaching said respective photocells.

7. An identification device according to claim 6 further comprising means for positioning said known transparency comprising a frame for holding said transparency, motor means, a first wheel, belt means interconnecting said motor means with said first wheel, a first connecting rod eccentrically connecting said first wheel to one edge of said frame, a second wheel, second belt means interconnecting said motor means with said second wheel, a second connecting rod eccentrically connecting said second wheel to a second edge of said frame.

8. An identification device comprising means for providing light beams in parallel relationship one with respect to another, a prism having a first face disposed substantially perpendicular to said light beams, a second face disposed at an angle greater than about 42° with respect to said first face for internally reflecting said light beams, a third face angularly disposed with respect to said second face, said second face being arranged for receiving a human finger to be identified in direct physical contact therewith, means for positioning said finger on the second face of said prism comprising a plate pivotally mounted adjacent said second face, an opening in said plate for said finger to physically engage said second face when said finger is in position, a top guide and a pair of side guides disposed adjacent said opening to position said finger on said plate, rod means mounted and constructed to fit snugly between two fingers on said hand, said rod being resiliently mounted, resiliently mounted stop means engageable with the end of said finger, trigger means for retaining said plate at an angle with respect to said second face, said stop means being constructed to release said trigger when said finger is in position, thereby bringing said finger into direct physical engagement with the second face, a beam splitter, lens constructed and mounted to receive the light reflected at location on said second face where said object to be identified positioned on said second face does not contact said second face and to project the reflected light through said beam splitter, diaphragm means interposed between said lens means and said beam splitter, a first photocell and a second photocell, said beam splitter being arranged to direct light beams received from said lens to each of said photocells, a known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said first photocell, a second variable resistor having one terminal connected to the second terminal of said power supply means and having its second terminal connected to the second terminal of said second photocell, first relay means connected between the second terminal of said first photocell and the second terminal of said power supply means, said first relay means being operable when excessive pressure is applied to said second face by the object being identified, second relay means connected between the second terminal of said first photocell on the second terminal of said power supply means, said second relay means being operable when adequate pressure the object being identified, third relay means connected between the second terminal of said first photocell and the second terminal of a second photocell, said third relay means being operable when the comparison is not affirmative, fourth relay means connected to said second relay means, said fourth relay means being operable when said second relay means is actuated and said first and third relay means are not activated, and output means connected to said fourth relay means, means for positioning said transparency comprising a frame for holding said transparency, motor means, a first wheel, belt means interconnecting said motor means with said first wheel, a first connecting rod eccentrically connecting said first wheel to one edge of said frame, a second wheel, second belt means interconnecting said motor means with said second wheel, a second connecting rod eccentrically connecting said second wheel to a second edge of said frame.

9. In an identification device, means for comparing a first optical image of an object to be identified with a second known image transparency comprising a first photocell and a second photocell, a beam splitter for directing said first optical image onto each of said photocells, said second known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said photocell, a second variable resistor having one terminal connected to the first terminal of said power supply means and having a second terminal connected to a second terminal of said second photocell, indicator means having one terminal connected to the second terminal of said first variable resistance and its second terminal connected to the second terminal of said second variable resistance.

10. In an identification device, means for comparing a first optical image of an object to be identified with a known image transparency comprising a prism for forming said first optical image having a first face, a second face disposed at an angle with respect to said first face and third face angularly disposed with respect to said second face, said second face being arranged for receiving said object in direct physical contact therewith, means for projecting collimated light onto said second face to be reflected at locations thereon where said object does not contact said second face whereby said reflected light forms said first image a first photocell and a second photocell, a beam splitter for directing said first optical image onto each of said photocells, said known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said first photocell, a second variable resistor having one terminal connected to the second terminal of said power supply means and having its second terminal connected to the second terminal of said second photocell, first relay means connected between the second terminal of said first photocell and the second terminal of said power supply means, said first relay means being operable when excessive pressure is applied to said second face by the object being identified, second relay means connected between the second terminal of said first photocell on the second terminal of said power supply means, said second relay means being operable when adequate pressure is applied to said second face by the object being identified, third relay means connected between the second terminal of said first photocell and the second terminal of a second photocell, said third relay means being operable when the comparison is not affirmative, fourth relay means connected to said second relay means, said fourth relay means being operable when said second relay means is actuated and said first and third relay means are not activated, and output means connected to said fourth relay means.

11. An identification device comprising means for directing light beams in parallel relationship one with respect to another, a prism having a first face disposed substantially perpendicular to said light beams, a second elongated face disposed at an angle of at least about 42° with respect to said first face for internally reflecting said light beams within said prism, a third elongated face disposed in space parallel relationship with respect to said second face for internally reflecting said light beams within said prism, a fourth reflectively coated face disposed at an angle with respect to the second face equal to the angle between said first face and said second face, said second face being constructed for receiving an object to be identified in direct physical contact therewith for breaking the internal reflection at the points of contact and scattering the incident light at said points, means disposed adjacent said third face for comparing an image formed by the light scattered by the points of contact of said object to be identified with a known image.

12. An identification device according to claim 11 wherein said means for directing light beams comprises a light source, lens means mounted for deflecting the light beams from said light source into parallel relationship one with respect to another.

13. An identification device according to claim 11 wherein said angle between said first face and said second face is of the order of 45° and wherein said angle between said fourth face and said second face is of the order of about 45°.

14. An identification device according to claim 11 wherein said means for comparing an image comprises a beam splitter, a lens means constructed and mounted to receive light scattered by the points of contact of said object to be identified positioned on said second face and to project said scattered light through said beam splitter, diaphragm means interposed between said lens means and said beam splitter.

15. An identification device according to claim 11 wherein said object to be identified is a human finger on the hand of a person to be identified, and further comprising means for positioning said finger on said second face.

16. An identification device according to claim 11 wherein said means for comparing images comprises a beam splitter, lens constructed and mounted to receive the light scattered by the points of contact of said object to be identified positioned on said second face and to project said scattered light through said beam splitter, diaphragm means interposed between said lens means and said beam splitter, a first image plane and a second image plane angularly disposed one with respect to the other, said beam splitter directing light beams received from said second lens to each of said image planes, a known image transparency interposed between said second prism and said second image plane, and means for comparing the images in said image planes.

17. An identification device according to claim 11 wherein said means for comparing images comprises a beam splitter, a lens means constructed and mounted to receive light scattered by the points of contact of said object to be identified on said second face and to project said scattered light through said beam splitter, diaphragm means interposed between said lens means and said beam splitter, a first photocell and a second photocell, said beam splitter being arranged to direct light beams received from said lens to each of said photocells, a known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said first photocell, a second variable resistor having one terminal connected to the second terminal of said power supply means and having its second terminal connected to the second terminal of said second photocell, first relay means connected between the second terminal of said first photocell and the second terminal of said power supply, said first relay means being operable when excess pressure is applied to said second face by the object being identified, second relay means connected between the second terminal of said first photocell and the second terminal of said power supply means, said second relay means being operably actuated when adequate pressure is applied to said second face by the object being identified, third relay means connected between the second terminal of said first photocell and the second terminal of said second photocell, said third relay means being operable when the comparison is not affirmative, fourth relay means connected to said second relay means, said fourth relay means being operable when said second relay means is actuated and said first and third relay means are not activated, and output means connected to said fourth relay means.

18. An identification device according to claim 11 wherein said means for comparing images comprises a beam splitter, lens constructed and mounted to receive light scattered by the points of contact of said object to be identified positioned on said second face and to project said scattered light through said beam splitter, diaphragm means interposed between said lens and said beam splitter, a first photocell and a second photocell, said beam splitter being arranged to direct light beams received from said lens to each of said photocells, a known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said first photocell, a second variable resistor having one terminal connected to the second terminal of said power supply means and having its second terminal connected to the second terminal of said second photocell, indicator means having one terminal connected to the second terminal of said first variable resistor and its second terminal connected to the second terminal of said second variable resistor.

19. An identification device according to claim 18 further comprising means for positioning said transparency comprising a frame for holding said transparency, motor means, a first wheel, belt means interconnecting said motor means with said first wheel, a first connecting rod eccentrically connecting said first wheel to one side of said frame, a second wheel, second belt means interconnecting said motor means with said second wheel, a second connecting rod eccentrically connecting said second wheel to a second side of said frame.

20. An identification device according to claim 18 wherein said indicator means comprises a voltmeter.

21. An indicator device according to claim 18 wherein said indicator means comprises a relay operable upon a predetermined differential voltage between the second terminal of said first variable resistor and the second terminal of said second variable resistor.

22. An identification device comprising means providing light beams in parallel relationship one with respect to another, a prism having a first face disposed substantially perpendicular to said light beams, a second elongated face disposed at an angle of at least about 42° with respect to said first face for internally reflecting said light beams within said prism, a third elongated face disposed in spaced parallel relationship with respect to said second face for internally reflecting said light beams within said prism, a fourth reflectively coated face disposed at an angle with respect to the second face equal to the angle between said first face and said second face, said second face being constructed for receiving one finger on a hand to be identified in direct physical contact therewith, means for positioning said one finger on said second face comprising a plate pivotally mounted adjacent said second face, an opening in said plate for said one finger to physically engage said second face when said one finger is in position, a top guide and a pair of side guides disposed adjacent said opening to position said one finger on said plate, rod means mounted and constructed to fit snugly between two other fingers on said hand, said rod being resiliently mounted, resiliently mounted stop means engageable with the end of said one finger, trigger means for retaining said plate at an angle with respect to said second face, said stop means being constructed to release said trigger when said one finger is in its position, thereby bringing said one finger into direct physical engagement with the second face, a beam splitter, a lens constructed and mounted to receive the light scattered by the points of contact of said one finger positioned on said second face and to project said scattered light through said beam splitter, diaphragm means interposed between said lens means and said beam splitter, a first photocell and a second photocell, said beam splitter being arranged to direct light beams received from said lens to each of said photocells, a known image transparency interposed between said beam splitter and said second photocell, power supply means, one terminal of said power supply means being connected to one terminal of said first photocell and said one terminal of said power supply means being connected to one terminal of said second photocell, a first variable resistor having one terminal connected to the second terminal of said power supply means and having its second terminal connected to the second terminal of said first photocell, a second variable resistor having one terminal connected to the second terminal of said power supply means and having its second terminal connected to the second terminal of said second photocell, first relay means connected between the second terminal of said first photocell and the second terminal of said power supply means, said first relay means being operable when excessive pressure is applied to said second face by said one finger, second relay means connected between the second terminal of said first photocell on the second terminal of said power supply means, said second relay means being operable when adequate pressure is applied to said second face by said one finger, third relay means connected between the second terminal of said first photocell and the second terminal of a second photocell, said third relay means being operable when the comparison is not affirmative, fourth relay means connected to said second relay means, said fourth relay means being operable when said second relay means is actuated and said first and third relay means are not activated, and output means connected to said fourth relay means, means for positioning a transparency comprising a frame for holding said transparency, motor means, a first wheel, belt means interconnecting said motor means with said first wheel, a first connecting rod eccentrically connecting said first wheel to one edge of said frame, a second wheel, second belt means interconnecting said motor means with said second wheel, a second connecting rod eccentrically connecting said second wheel to a second edge of said frame.

* * * * *